US009483255B2

(12) United States Patent
Katsaros et al.

(10) Patent No.: US 9,483,255 B2
(45) Date of Patent: Nov. 1, 2016

(54) APPLICATION RESOURCE UPDATES

(75) Inventors: Georgios Katsaros, Apex, NC (US); Paul Novak, Morrisville, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 2415 days.

(21) Appl. No.: 12/042,209

(22) Filed: Mar. 4, 2008

(65) Prior Publication Data
US 2009/0228878 A1 Sep. 10, 2009

(51) Int. Cl.
*G06F 9/44* (2006.01)

(52) U.S. Cl.
CPC ........................ *G06F 8/68* (2013.01)

(58) Field of Classification Search
CPC .............. G06F 8/68; G06F 8/65; G06F 8/61; H04L 29/08981
USPC ......................................................... 717/172
See application file for complete search history.

(56) References Cited

U.S. PATENT DOCUMENTS

| | | | |
|---|---|---|---|
| 6,842,839 B2 | 1/2005 | Heng et al. | |
| 7,127,712 B1 | 10/2006 | Noble et al. | |
| 2002/0152399 A1* | 10/2002 | Smith .......................... | 713/200 |
| 2006/0282479 A1 | 12/2006 | Johnson et al. | |
| 2007/0038570 A1* | 2/2007 | Halbritter et al. .............. | 705/50 |
| 2007/0207777 A1 | 9/2007 | Owen et al. | |
| 2007/0240054 A1 | 10/2007 | Todoroki et al. | |
| 2008/0046786 A1* | 2/2008 | Patel et al. ..................... | 714/100 |
| 2009/0253424 A1* | 10/2009 | Owen et al. ................... | 455/419 |
| 2010/0304735 A1* | 12/2010 | Hursey et al. ................. | 455/423 |

FOREIGN PATENT DOCUMENTS

| | | |
|---|---|---|
| GB | 2360376 A | 9/2001 |
| WO | 2007/070295 A1 | 6/2007 |

OTHER PUBLICATIONS

Mahmoud, Q.H., "J2ME MIDP and WAP Complementary Technologies", Feb. 2002, Sun Microsystems, Inc., available at http://developers.sun.com/mobility/midp/articles/midpwap/.
Mahmoud, Q.H., "Mobile Data Services and Platforms", Aug. 2006, Sun Microsystems, Inc., available at http://developers.sun.com/mobility/midp/articles/midpwap2/?feed_DSC.
Java Specification Request 248, Mobile Service Architecture Specification, V1.00, Sep. 27, 2006, Java Community Process, Java Platform, Micro Edition.
Office Action in corresponding Israel Application No. 207849 dated Sep. 2, 2015.
Communication pursuant to Art. 94(3) EPC issued in corresponding European application No. 09 718 500.3, dated Jul. 14, 2014.
Communication pursuant to Art. 94(3) EPC issued in corresponding European application No. 09 718 5003, dated May 12, 2015.

* cited by examiner

*Primary Examiner* — Anna Deng
(74) *Attorney, Agent, or Firm* — Patent Portfolio Builders PLLC

(57) ABSTRACT

Solutions are described that enable a user equipment (UE) for a communication system to modify resource files, e.g., audio files, picture files, video clips, etc., used by Java applications without requiring downloading of entire applications. Error reports are sent to application providers that relate to specific resource files based on modified application descriptor files.

20 Claims, 3 Drawing Sheets

APPLICATION RESOURCE UPDATES

BACKGROUND

This invention relates to software environments and more particularly to updating software components in such environments.

In general, a "software component" is a computer program object or a collection of objects that conforms to a specification, such as Java, the component object model (COM), the distributed component object model (DCOM), etc. The advantages of using software components include modularity, support for distributed processing systems, and language independence, which means that software components implemented in different computer programming languages can work together.

Java Micro Edition (JME) is a platform or environment that is often used in devices having limited processing resources, such as mobile telephones and other terminals in digital communication systems. Software components written in Java, i.e., Java applications, which are sometimes called midlets, are executed by processors in such devices, and such components implement many device functions, e.g., display of image or text files, playback of audio or video files, etc. A Java application is typically downloaded as a set of compiled Java files (i.e., class files). During execution, the application's classes are loaded into a virtual machine (VM).

The use of JME for programming communication devices is described in, for example, Q. H. Mahmoud, "Mobile Device Services and Platforms", August 2006, available at developers.sun.com/mobility/midp/articles/midpwap2/ ?feed=DSC and Q. H. Mahmoud, "J2ME MIDP and WAP Complementary Technologies", February 2002, available at http://developers.sun.com/mobility/midp/articles/midp-wap/. A midlet is described in a Java Descriptor (JAD) file and is run in a midlet management software that provides an operating environment. When finished running, a midlet remains installed on a device until it is removed.

Development of Java applications and similar software components is a continual process, and so occasionally applications already installed in a device are superseded by updated or upgraded versions. The JME environment currently provides for updating or upgrading a midlet by having the user of a device (1) search for another version of the Java application that best fits on the device, (2) download the other version, and (3) install the replacement version of the Java application.

With the current update procedure, an entire Java application is downloaded even if only one resource file, e.g., an audio file, in the application needs to be updated. Thus, the current update procedure can waste time and communication system bandwidth. Moreover, the user needs to perform the entire update procedure and then execute the application before the user can determine whether the application fits on the user's device, which is to say that the device has enough memory for it. Again, this can waste the user's time and cause dissatisfaction with the user's device.

It would be advantageous to streamline the current update procedure to make it more accessible for inexperienced users and to help ensure that users install the correct versions of their applications. It would also be advantageous for the update procedure to help reduce fragmentation of an updated application by isolating the variable media resources.

SUMMARY

In accordance with aspects of this invention, there is provided a method of updating a resource file used by a software application executable by an electronic processor in a user equipment for a communication system. The method includes the steps of finding a question about the resource file; forming a report message for transmission through an available communication network to a provider of the application corresponding to the resource file; sending the report message; receiving in the user equipment a resource file responsive to the report message; and installing the received resource file in the user equipment. The provider is identified by an attribute value in a descriptor file that corresponds to the resource file.

In accordance with further aspects of this invention, there is provided an apparatus for updating a resource file used by a software application executable by an electronic processor in a user equipment for a communication system. The apparatus includes a processor configured to find a question about the resource file; form a report message for transmission through an available communication network to a provider of the application corresponding to the resource file; cause the user equipment to send the report message; and install in the user equipment a resource file received in response to the report message. The provider is identified by an attribute value in a descriptor file that corresponds to the resource file.

In accordance with further aspects of this invention, there is provided a computer-readable medium having stored instructions that, when executed, cause the computer to perform a method of updating a resource file used by a software application executable by an electronic processor in a user equipment for a communication system. The method includes the steps of finding a question about the resource file; forming a report message for transmission through an available communication network to a provider of the application corresponding to the resource file sending the report message; receiving in the user equipment a resource file responsive to the report message; and installing the received resource file in the user equipment. The provider is identified by an attribute value in a descriptor file that corresponds to the resource file.

BRIEF DESCRIPTION OF THE DRAWINGS

The various features, objects, and advantages of this invention will be apparent after reading this description together with the drawings, in which.

DETAILED DESCRIPTION

Figure 1:
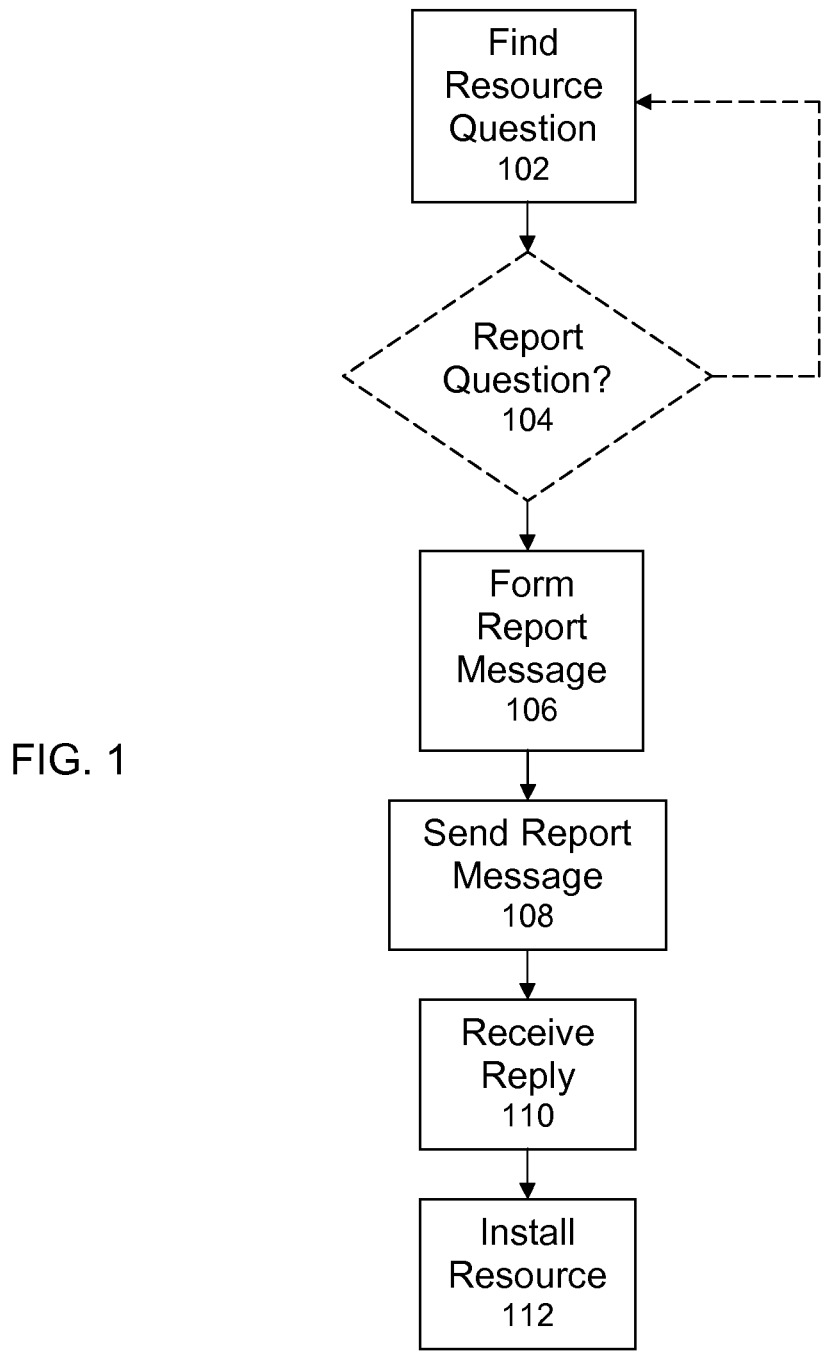
FIG. 1 is a flow chart of a method of updating application resources.

The inventors have recognized that a Java execution environment such as JME can be improved with respect to different devices' handling of Java resources, e.g., audio files, picture files, video clips, etc., by modifying the typical definition of a JAD file. It will be appreciated that such modification does not violate the Java specifications, which permit definition of new attributes provided those definitions do not contradict existing ones.

Thus, the inventors have developed a procedure that can process back to the provider of a Java application error reports from user devices relating to specific resource files used by the Java application. For security reasons, it is currently preferred that the procedure includes interaction with the user before any information about the user's device is sent to an application provider. It should be understood, however, that it is not always necessary to ask the user before updating an application. When a Java application is part of a trusted domain (e.g., the UE manufacturer, network operator, or certain third parties), a device can be configured to update itself by downloading and installing updates automatically. If the Java application is part of the untrusted domain, automatic updates would not be permitted. The Java security framework is defined in Java Specification Request (JSR) 248.

The inventors' modified definition of attributes involves creating service points for updating resource files. The artisan will understand that a service point is an attribute that has a value providing the resource file that can be updated when the user of the device or the device itself discovers incompatibility. For example, a service point attribute 1 can have a form in a JAD file as follows:

Midlet-Service-Point-Attribute-1: Midlet-Service-Point-Attribute-Value-1 where the left-hand side is the service point identifier and the right-hand side is an address or other location identification of the service point.

The inventors have recognized that a service point provider attribute can also be defined in the JAD file, and the Java application can then use that attribute information to request resource updates from the defined Java application provider. For example, a suitable service point provider attribute 1 can have a form in a JAD file as follows:

Midlet-Service-Point-Provider-Attribute-1: Midlet-Service-Point-Provider-Attribute-Value-1

Such service point resource provider attributes can be used with associated resource file attributes to isolate resource files that may be updated from time to time, streamlining the update process by focussing a download on the resource file to be updated and avoiding a download of an entire application. The following examples illustrate such resource provider attributes and associated resource file attributes.

Example 1

Midlet-Upgrade-Resource-Provider-1: www.ericsson.com
Midlet-Upgrade-Resource-Audio-1: Audio_Alpha.mp3

Example 2

Midlet-Upgrade-Resource-Provider-1: www.ericsson.com
Midlet-Upgrade-Resource-Audio-2: Audio_Beta.mp3

Example 3

Midlet-Upgrade-Resource-Provider-1: www.ericsson.com
Midlet-Upgrade-Resource-Video-1: Video_Gamma.jpeg Example 4

Midlet-Upgrade-Resource-Provider-1: www.ericsson.com
Midlet-Upgrade-Resource-Bitmap-1: Picture_Delta.mp3

In each of the preceding examples that can be included in JAD files, a service point resource provider attribute that points to a particular provider address (in the examples, www.ericsson.com) is associated with a service point resource file attribute that points to a particular resource file in a Java application (in the examples, mp3 or jpeg files). It will be noted that provider attributes and resource attributes are provided in pairs, and many such pairs can be provided.

When a user of a device or the device itself finds an error that does not prevent the successful execution of a Java application, the application preferably continues executing but reports the error to the user by displaying a suitable warning message and asking the user whether to send error information to the Java application provider. Along with the error information, information about the device's constraints (e.g., memory capacity, operating system, etc.) is also advantageously sent to the provider. It will be understood that the error report to the user preferably warns the user that the phone number of the device will be sent to Java application provider because that number may be needed by the provider to "push" a short message, such as a text message, back to the user's device about a possible update of the resource file in question.

It will be appreciated that the user of a device advantageously can request updates of resource files without receiving error reports. In that case, the Java resource file is compatible with the device's Java execution environment and constraints, but the user can still download an improved version of a resource file if one is available from the Java application provider.

As described above, a method of updating application resources rather than entire applications can then include the following steps, which are illustrated by the flow chart in FIG. 1. In step 102, the device or its user finds a question about a resource, e.g., an audio file, a bitmap (image) file, etc. The question can arise as a result of either a problem in application execution or a desire by a user to look for an update of the resource. If the question arises from a problem, the device's Java execution environment, such as JME, reports the discovered problem to the user as a suitable warning message.

In step 104, the device's Java execution environment asks the user whether to send information through an available communication network to the provider of the application corresponding to the discovered problem. As described above, an address or other location of that provider is identified in the relevant JAD file by a suitable attribute value. Step 104 is indicated in dashed lines because a device can be configured to update itself by downloading and installing updates automatically when a Java application is part of a trusted domain. If the question is reported to the user and the user does not choose to contact the provider (No in step 104), the method flow simply returns, but if the user chooses to contact the provider (Yes in step 104), a suitable report message is formed by the device (step 106) for transmission to the provider.

A suitably configured report message can be transmitted through a wide variety of communication networks, e.g., GSM, general packet radio system (GPRS), or third generation (3G) cellular telephone networks, IEEE 802.11a/b/g/n (WiFi) networks, etc. The report message, which can be called a Java Application Provider—User Request message, advantageously includes one or more of the following information elements:

an error code that indicates details of the incompatibility between the user's device and the resource file;
a domain, e.g., audio, video, picture, etc.;
a resource file name;
a device name and other characteristics identifying the user's device; and
a mobile phone number, TCP/IP address, or other suitable identification of the device.

The report message is prepared based on reading, in the corresponding JAD file, the service point attribute that corresponds to the resource file in question. As explained above, the service point value is an address, typically an Internet address, that identifies the Java application provider.

In step 108, the device sends the report message to the network and the Java application provider. The network may forward the report message directly to the provider or the network may direct the message to its own suitable provider proxy database. In the case of a proxy, and if a resource file already exists in the proxy database that matches the user's request, the proxy sends that resource file to the user. If not already sent by a network proxy, the Java application provider sends a corresponding resource file for the Java application to the user.

In any case, a resource file responsive to the report message is sent to the user's device, e.g., by using one of the mobile phone number, TCP/IP address, or other identification of the device that was included in the report message. The resource can be sent as a message via an already established communication service, e.g., a short message service (SMS) message, an e-mail message, or a Web/WAP-protocol message. If the network maintains a database of resource files, a resource file sent by an application provider can be saved by the network.

Upon receiving a reply to the report message (step 110), the device's Java execution environment installs the received resource file, replacing the existing resource file. Execution of a Java application may be interrupted in order to replace the existing resource file with the corrected one, and the Java execution environment can then restart the Java application if the user chooses to do so.

Such updating methods can be advantageously employed in many digital communication systems, which include time-division multiple access (TDMA) systems, such as cellular radio telephone systems that comply with the GSM telecommunication standard and its enhancements, such as GPRS and Enhanced Data Rates for GSM Evolution (EDGE), and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a 3G mobile system being developed by the European Telecommunications Standards Institute (ETSI) within the International Telecommunication Union's (ITU's) IMT-2000 framework. The Third Generation Partnership Project (3GPP) promulgates specifications for UMTS, WCDMA, and GSM communication systems.

Figure 2:
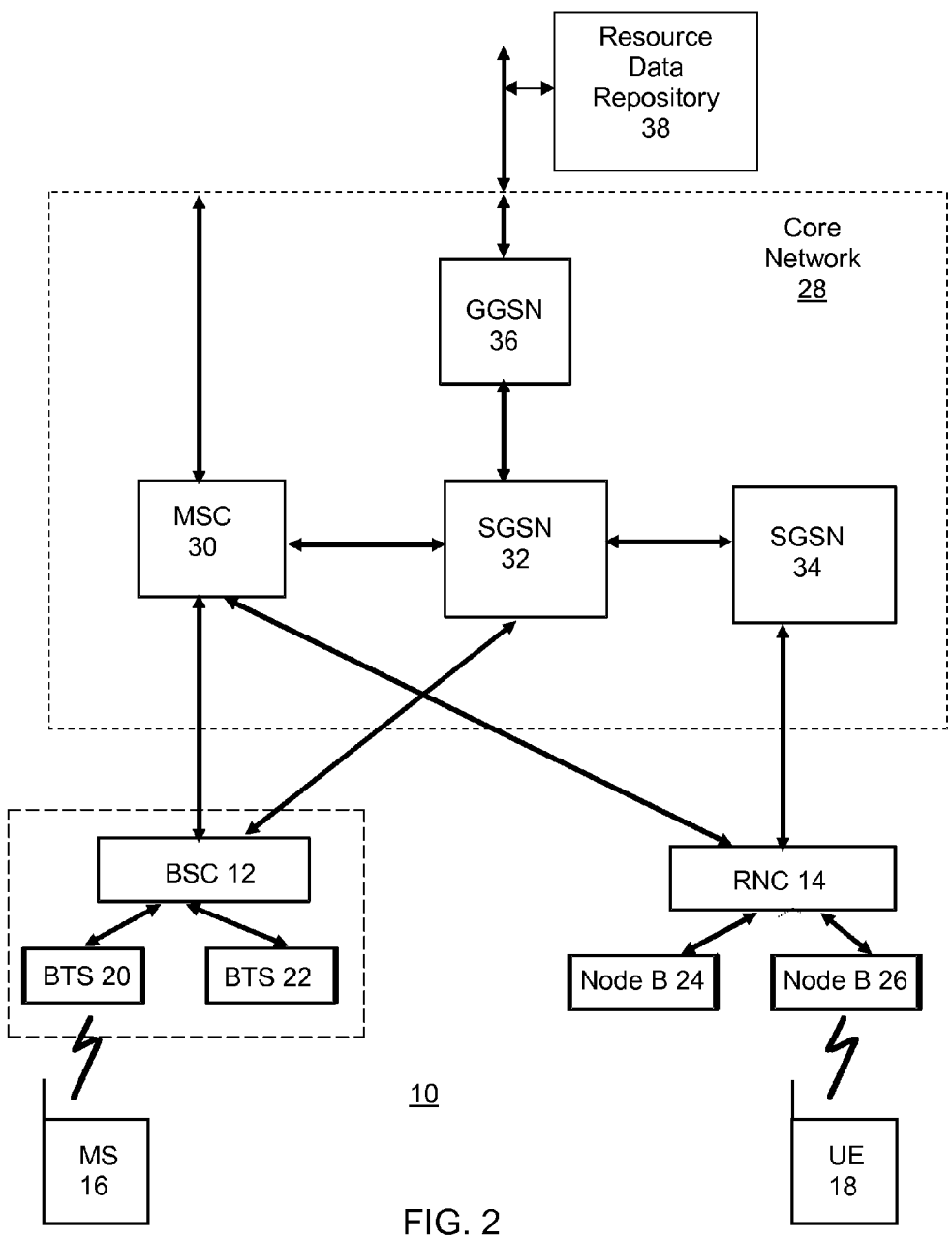
FIG. 2 depicts a communication system.

FIG. 2 depicts a cellular radio telephone system 10. A base station controller (BSC) 12 and a radio network controller (RNC) 14 control various radio network functions, including for example radio access bearer setup, diversity handover, etc. More generally, the BSC and RNC direct connections to/from mobile stations (MSs) 16 and user equipments (UEs) 18, which may be mobile telephones or other remote terminals, via the appropriate base transceiver station(s) (BTSs) and Node Bs, which communicate with each MS and UE through downlink (i.e., BTS/Node B to MS/UE) and uplink (i.e., MS/UE to BTS/Node B) channels. BSC 12 is shown coupled to BTSs 20, 22, and RNC 14 is shown coupled to Node Bs 24, 26. Each BTS/Node B serves a geographical area that can be divided into one or more cell(s). The BTSs/Node Bs are coupled to their corresponding BSC/RNC by dedicated telephone lines, optical fiber links, microwave links, etc. A BSC and its connected BTSs generally comprise a base station system (BSS), as indicated by the dashed lines in FIG. 2.

The BSC 12 and RNC 14 are connected to external networks such as the public switched telephone network (PSTN), the Internet, etc. through one or more nodes in a core network 28. As depicted in FIG. 2, the core network 28 includes a mobile switching center (MSC) 30, and packet radio service nodes, such as serving GPRS support nodes (SGSNs) 32, 34, and a gateway GPRS support node 36. Although an application-resource proxy database 38 is a data repository that can stand apart from the cellular infrastructure depicted in FIG. 2, data (e.g., one or more resource files) can be cached in one or more of the SGSNs 32, 34 for improved updating performance. It will be appreciated of course that various names can be used for the devices depicted in FIG. 2, and for simplicity, the terminals 16, 18 are commonly called UEs in this application.

Figure 3:
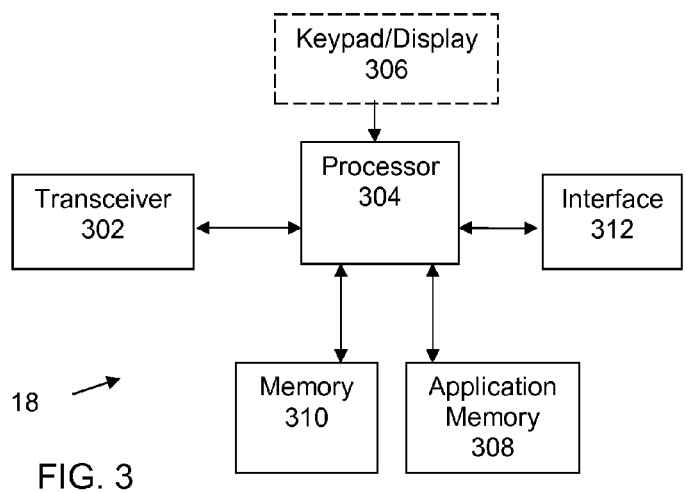
FIG. 3 is a block diagram of a user equipment for a communication system.

FIG. 3 is a block diagram of a UE 18 that can implement the updating methods described above. The UE 18 includes a transceiver 302 that is suitable for exchanging radio signals with BTSs/Node Bs in a network (not shown in FIG. 3). Information carried by those signals is handled by a processor 304, which may include one or more sub-processors, and which executes one or more software modules and applications to carry out the methods described in this application. User input to the UE 18 is provided through a keypad or other device, and information may be presented to the user on a display 306. The keypad/display 306 is considered optional, and is thus indicated by dashed lines, because some devices, such as embedded mobile devices and machine-to-machine communication modules, may not need a keypad or a display. Software applications may be stored in a suitable application memory 308, and the device may also download and/or cache desired information in a suitable memory 310. The UE 18 also may include an interface 312 that can be used to connect other components, such as a computer, keyboard, etc., to the UE 18.

Figure 4:
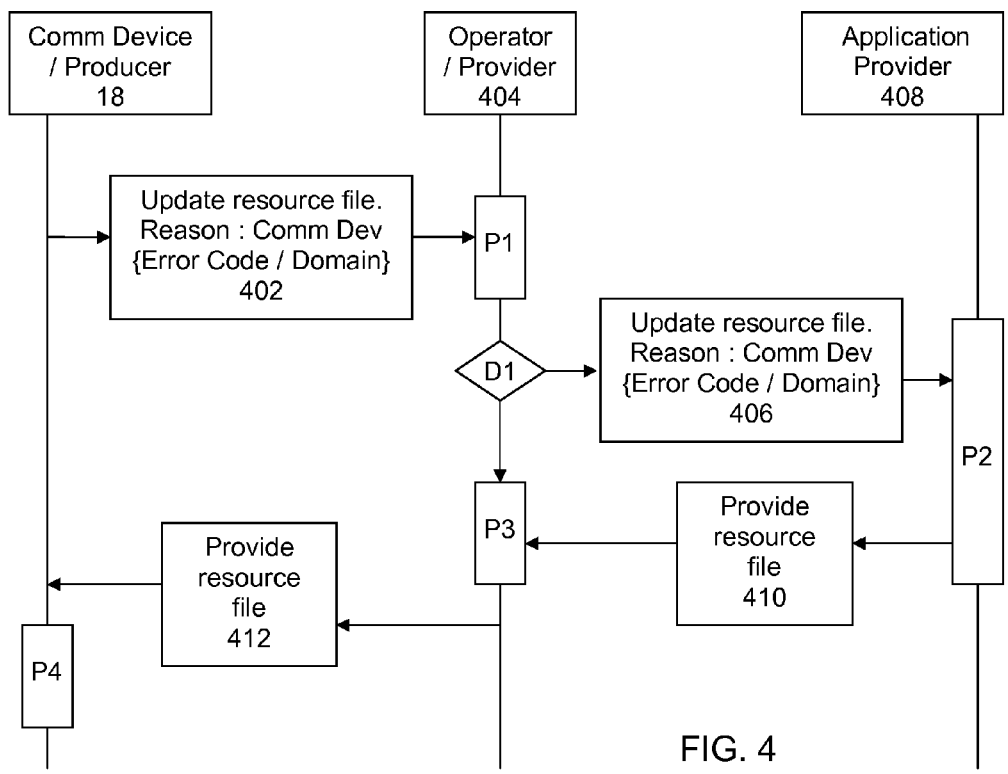
FIG. 4 illustrates use cases of methods of updating application resources in communication systems.

FIG. 4 illustrates exemplary use cases of methods of updating application resources in communication systems. In FIG. 4, a user has found an error while using a resource file with a Java application, e.g., an audio file that cannot be played back. The user, and more particularly the user's UE 18, sends a message 402 to the network operator 404 that reports the error and seeks to update the resource file. As described above, the report message 402 preferably includes a description of the error that caused the request, such as an error code; a domain (in this use case, audio); a resource file name; a device name and other characteristics identifying the user's device; and a mobile phone number, TCP/IP address, or other suitable identification of the device. As illustrated by FIG. 4, the request message is processed (P1) by the operator or other recipient 404 as needed to determine how to handle the request, and in particular to decide (D1) where to obtain the requested resource file.

As described above, the network 404 may decide to forward the report message or another suitable message 406 directly to the application provider 408 or the network 404 may handle the report message with its own provider proxy database or repository 38 (not shown in FIG. 4). If the network decides to send a request 406, the request is processed (P2) by the provider 408 as needed to determine how to handle the request, which as shown can result in provision of the requested resource file to the network operator 404 by a suitable message 410. The provided resource file message 410 is processed (P3) by the network operator 404 as needed to provide the resource file to the UE 18 via a message 412 that the UE 18 processes (P4) as needed to update the received resource file. In the case of a provider proxy accessible to the network, and if a resource file already exists in the proxy database that matches the user's request 402, the network 404 processes (P3) the request such that the resource file is retrieved from the repository and sent to the user. In either case, the resource file responsive to the report message 402 is sent to the user's device, e.g., by using one of the mobile phone number, TCP/IP address, or other identification of the device that was included in the report message. The resource can be sent as a message via an already established communication service, e.g., an SMS message, an e-mail message, or a Web/WAP-protocol message. If the network 404 maintains a database of resource files, a resource file sent by the application provider 408 can be saved by the network.

It will be appreciated that the report message 402 can also indicate a reason for the message, e.g., that the user has found an error, but it will also be appreciated that the reason can instead be that the device has found the error. Moreover, the report message 402 can indicate that the user or device has not found an error but is inquiring about the availability of an update of the resource file.

The artisan will understand that procedures described above are carried out repetitively as necessary, for example, to respond to the time-varying nature of communication channels between transmitters and receivers. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of updating an existing Java resource file, where the existing Java resource file is being used by a Java software application executable by an electronic processor in a user equipment for a communication system, comprising the steps of:
    finding an error arising from the existing Java resource file, wherein the error is an execution error of the Java software application;
    forming a report message, relating to the existing Java resource file wherein the error arose, for transmission through an available communication network to a provider of the application corresponding to the existing Java resource file, wherein the provider is identified in the report message, and wherein forming the report message comprises reading a descriptor file corresponding to the existing Java resource file that includes: at least a pair of service point attributes for updating the existing Java resource file, a pair of service point attributes having a respective resource value identifying the existing Java resource file that can be updated, and a provider attribute value identifying the provider and a location of the existing Java resource file;
    sending the report message;
    receiving in the user equipment a new Java resource file responsive to the report message; and
    installing the received new Java resource file in the user equipment, to replace the existing Java resource file, and to correct the error.

2. The method of claim 1, wherein the existing or new Java resource file is an audio file, an image file, or a video file.

3. The method of claim 1, wherein the finding step is performed in response to a problem in application execution.

4. The method of claim 1, further comprising the steps of reporting the error to a user as a warning message, and asking the user whether to send the report message to the provider of the application.

5. The method of claim 1, wherein the report message includes at least one of an error code that indicates details of an incompatibility between the user equipment and the existing Java resource file, a domain of the existing Java resource file, a resource file name of the existing Java resource file, a characteristic identifying the user equipment, and an identification of the user equipment.

6. The method of claim 1, wherein the step of sending the report message includes either forwarding the report message to the provider or directing the report message to a proxy database in the communication network.

7. The method of claim 1, wherein the step of installing the received new Java resource file includes interrupting execution of the software application and re-starting execution of the software application with the received new Java resource file.

8. An apparatus for updating an existing Java resource file, where the existing Java resource file is being used by a Java software application executable by an electronic processor in a user equipment for a communication system, comprising a processor configured to:

find an error arising from the existing Java resource file, wherein the error is an execution error of the Java software application;

form a report message, relating to the existing Java recourse file wherein the error arose, for transmission through an available communication network to a provider of the application corresponding to the existing Java resource file, wherein the provider is identified in the report message, and wherein forming the report message comprises reading a descriptor file corresponding to the existing Java resource file that includes: at least a pair of service point attributes for updating the existing Java resource file, a pair of service point attributes having a respective resource value identifying the existing Java resource file that can be updated, and a provider attribute value identifying the provider and a location of the existing Java resource file;

cause the user equipment to send the report message; and install in the user equipment a new Java resource file received in response to the report message, to replace the existing Java resource file.

9. The apparatus of claim 8, wherein the existing or new Java resource file is an audio file, an image file, or a video file.

10. The apparatus of claim 8, wherein the processor is configured to find the error arising from the existing Java resource file in response to a problem in application execution.

11. The apparatus of claim 8, wherein the processor is further configured to report the error to a user as a warning message, and ask the user whether to send the report message to the provider of the application.

12. The apparatus of claim 8, wherein the report message includes at least one of an error code that indicates details of an incompatibility between the user equipment and the existing Java resource file, a domain of the existing Java resource file, a resource file name of the existing Java resource file, a characteristic identifying the user equipment, and an identification of the user equipment.

13. The apparatus of claim 8, wherein the processor is configured to install the received new Java resource file at least by interrupting execution of the software application and re-starting execution of the software application with the received new Java resource file.

14. A non-transitory computer-readable medium having stored instructions that, when executed, cause the computer to perform a method of updating an existing Java resource file being used by a Java software application executable by an electronic processor in a user equipment for a communication system, wherein the method comprises the steps of:

finding an error arising from the existing Java resource file, wherein the error is an execution error of the Java software application;

forming a report message, relating to the existing Java resource file wherein the error arose, for transmission through an available communication network to a provider of the application corresponding to the existing Java resource file, wherein the provider is identified in the report message, and wherein forming the report message comprises reading a descriptor file corresponding to the existing Java resource file that includes: at least a pair of service point attributes for updating the existing Java resource file, a pair of service point attributes having a respective resource value identifying the existing Java resource file that can be updated, and a provider attribute value identifying the provider and a location of the existing Java resource file;

sending the report message;

receiving in the user equipment a new Java resource file responsive to the report message; and installing the received new Java resource file in the user equipment, to replace the existing Java resource file.

15. The non-transitory medium of claim 14, wherein the existing or new Java resource file is an audio file, an image file, or a video file.

16. The non-transitory medium of claim 14, wherein the finding step is performed in response to a problem in application execution.

17. The non-transitory medium of claim 14, wherein the method further comprises the steps of reporting the error to a user as a warning message, and asking the user whether to send the report message to the provider of the application.

18. The non-transitory medium of claim 14, wherein the report message includes at least one of an error code that indicates details of an incompatibility between the user equipment and the existing Java resource file, a domain of the existing Java resource file, a resource file name of the existing Java resource file, a characteristic identifying the user equipment, and an identification of the user equipment.

19. The non-transitory medium of claim 14, wherein the step of sending the report message includes either forwarding the report message to the provider or directing the report message to a proxy database in the communication network.

20. The non-transitory medium of claim 14, wherein the step of installing the received new Java resource file includes interrupting execution of the software application and re-starting execution of the software application with the received new Java resource file.

* * * * *